July 22, 1958  J. R. BIRD ET AL  2,844,792
HIGH FREQUENCY ELECTRICAL METER CARTRIDGE
Filed Nov. 26, 1952  2 Sheets-Sheet 1

INVENTORS
JAMES R. BIRD
HENRY J. CALDERHEAD
BY George Knowles
ATTORNEY

July 22, 1958    J. R. BIRD ET AL    2,844,792
HIGH FREQUENCY ELECTRICAL METER CARTRIDGE
Filed Nov. 26, 1952    2 Sheets-Sheet 2

INVENTORS
JAMES R. BIRD
HENRY J. CALDERHEAD
BY George Knowles
ATTORNEY

United States Patent Office 2,844,792
Patented July 22, 1958

2,844,792

HIGH FREQUENCY ELECTRICAL METER CARTRIDGE

James R. Bird, Chagrin Falls, and Henry J. Calderhead, Euclid, Ohio, assignors to Bird Electronic Corporation, Cleveland, Ohio, a corporation of Ohio Application November 26, 1952, Serial No. 322,768

20 Claims. (Cl. 324—95)

This invention relates to electrical measuring devices for use at high frequencies. It is particularly concerned with the provision of such a device for use over a wide frequency band, preferably inclusive of a frequency range higher than that covered by a similar and earlier device described in patent application Serial No. 116,318 filed September 17, 1949 for Method of and Apparatus for Measuring High Frequency Energy, now Patent No. 2,702,368.

High frequency electrical instruments present design and assembly problems that complicate creation of commercially successful devices. The effects of distributed capacitance and inductance disturb results obtained when components are conventionally arranged and connected. It has been generally recognized that the desired theoretical results can be more effectively approached in practice by resorting to compact assemblies having short connections. The obtaining of short electrical connections between components of a high frequency electrical measuring device of the character referred to is therefore one of the principal objectives of the present invention, it being thus sought to obtain close adherence to theoretical circuit requirements and thereby improve operating accuracy generally.

Another objective is to provide a high frequency electrical device suitable for use in the measurement of voltage or power embodying components arranged in a compact rugged assembly that can be readily put together in original production and can be easily serviced and repaired.

Another object is to provide an instrument which provides for easy adjustment in original assembly and also in subsequent service to compensate for variations in sensitivity of components employed in the instrument. As a specialized phase of the adjustability feature the invention affords a compact pickup cartridge useful in numerous applications in combination with a tubular high frequency electrical conductor, the mounting of the cartridge on the conductor for relative bodily movement affording a variation of relationship which permits not only the compensation referred to for incidental fluctuations in sensitivity of the electrical components incorporated in the cartridge, but also permits use of the same cartridge in instruments designed for widely varying ranges of power or energy.

Other objects and advantages pertain to certain features of construction and combinations and arrangements of parts by which are obtained simplicity and economy, as well as improved operating characteristics. Such will become apparent from the following detailed description of several embodiments of the invention. This description is made in connection with the accompanying drawings forming a part of the specification.

Electrical instruments or devices embodying the present invention are characterized by a pickup or coupling cartridge and rectifier assembly adapted for use in combination with a tubular electrical line having an access aperture. In one illustrative embodiment shown in Figures 1 through 6 the invention is used in an instrument such as a wattmeter or voltmeter of the peak reading type in which the pickup or coupling cartridge carrying the rectifier is mounted on a coaxial line which is in the form of a reflectionless termination, the electrical line comprising an outer conductor 1 and an inner conductor 2. This instrument is intended for use in the higher frequencies above several hundred megacycles, being particularly effective and exhibiting the desired flat response curve characteristics in the frequency range above about five hundred megacycles and as high as at least about three or four thousand megacycles. It will be apparent, however, that the principles disclosed in connection with this embodiment are useful in other types of instruments and over other wide frequency bands or at single frequencies by suitable modification, one such modification suitable for use over a somewhat lower frequency band being shown in detail in Figs. 7 through 12 as will later appear.

Figures 1, 6:
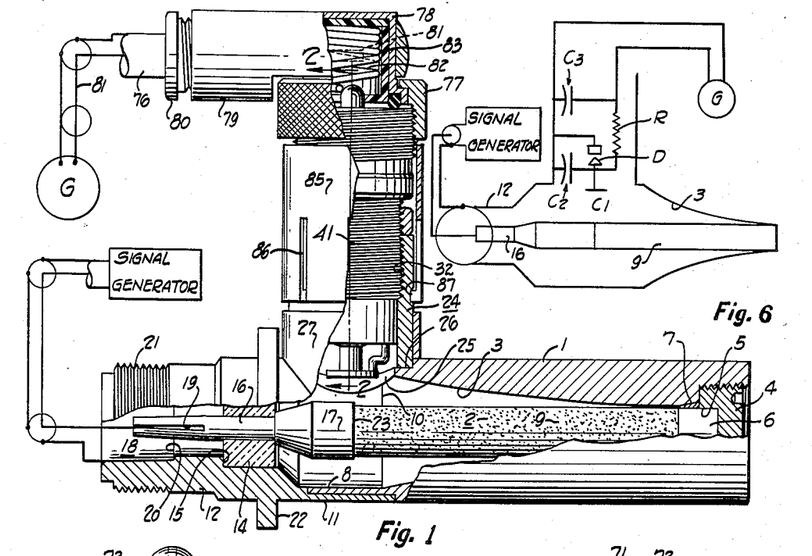
Figure 1 is an elevational view, partly diagrammatic, partly in section and with parts broken away and removed, of a high frequency measuring instrument embodying certain of the principles of the present invention, the instrument being of the peak reading meter type employing a capacitance voltage divider and incorporating in the combination a pickup or rectifier cartridge assembly.
Fig. 6 is a diagrammatic representation of the electrical circuit of the instrument.

The outer conductor, a circular sectioned turning of brass or similar metal, is formed with an internal tapered horn surface 3 coaxial to the inner conductor which comprises an elongated cylindrical rod or tube having deposited thereon a resistive carbon film indicated at 9. The curvature of the surface 3 and the resistance of the carbon film conductor 9 are so related in accordance with known principles that at each point along the length of the line the center conductor termination resistance between such point and the end of the line is equivalent to the characteristic impedance of the line measured at that point. Here the rod or tube carrying the resistive film 9 is a nominal one quarter inch in diameter and the effective length of the resistive film is one and one half inches, the other parts being proportioned as shown to provide about five watts power absorption on a nominal fifty ohm line.

A metal plug 4 that is screwed into an internally threaded counterbore in one end of the outer conductor 1 bears axially against a tapered split sleeve or wedge 7 that embraces a metalized or conductive paint band 6 on the corresponding end of the inner conductor 2. The wedge sleeve, by reason of its engagement in a correspondingly tapered portion of the outer conductor bore is forced to grip metalized paint contact band 6 of the inner conductor tightly in the provision of a good electrical circular line contact substantially at the minimum diameter of the tapered horn surface 3. The plug 4 is formed with a cylindrical recess 5 that receives the end of the inner conductor and the band 6 of aluminum or other conductive metal paint establishes an electrical connection between the resistive carbon film 9 and the metal sleeve 7 and through the latter shorts the inner conductor to the tapered outer conductor 1 at the small diameter end of the latter.

At its end opposite that receiving the plug 4 the conductor member 1 is formed with a tubular cylindrical line extension 8 that has an internal cylindrical surface continuous with the tapered surface 3, joining the latter at a circular line indicated at 10. The tubular line extension 8 is received telescopically within tubular end 11 of a combined line connecting and mounting element 12 comprising a turning of brass or similar metal. Within the element 12 an annular insulator 14 of suitable dielectric or insulating material such as polytetrafluoroethylene is located in a counterbore against a radial shoulder 15 and supportingly receives a center rodlike connector 16. The connector is formed at one end with an enlarged tubular socket portion 17 which receives as by a press fit the end of the ceramic tube or rod bearing the resistive carbon film and with the latter comprises the center conductor 2. The resistive film of the inner conductor extends into the cylindrical socket on the connector portion 17 and preferably carries a protective band of silver or other conductive paint to give good electrical connection between the resistive film and the center connector 16.

The outer end of the connector element 16 projects axially through internal chamber or passage 18 of the connector element 12 and is axially bored and slotted, as indicated at 19, to grippingly receive the center contact pin of a standard coaxial line fitting (not shown) used in connecting the device to a suitable signal generator or the like, as indicated diagrammatically. The central passage 18 in the connector element is counterbored at its outer end to provide the usual tapered socket and shoulder 20 for receiving and locating the tubular outer coupling element of the coaxial line fitting of the line being attached to the device. External threads 21 on the outer end of the element 12 receive the coupling nut of the coaxial line fitting. A radial mounting flange 22 surrounds the central portion of the connector element and locates the device when the body of the fitting 12 is inserted through an aperture in a panel or meter casing (not shown), the flange being adapted for receiving attaching screws or for being soldered in place to hold the device assembled to the panel.

Electrical energy is fed into the present device, as from the high frequency signal generator indicated, through a suitable coaxial transmission line connected to the device through the outer connector element 12 and the inner connector element 16, the electrical energy for the device of Figs. 1–6 being of the order of about 500 megacycles or more. The termination, comprising the tapered surface 3 of the outer conductor and the resistive film 9 of the inner conductor 2, absorbs such energy to the extent of about five watts substantially without reflection, it being understood that the several diameter and dielectric changes along the length of the line, including that portion formed by the inner and outer connector elements 16 and 12, respectively, are suitably proportioned to maintain the characteristic impedance of the line, here nominally fifty ohms, in accordance with well-known considerations.

One way in which energy transmitted along a coaxial line has been measured is by sampling through the use of a voltage divider of the capacitive or resistive type and by utilizing the sample portion of energy or voltage to influence an indicator such as a galvanometer. To obtain a suitable sample from the main coaxial line without distortion, to rectify the sample still without distortion and to then impress the rectified sample on a galvanometer external to the line has presented numerous difficulties related to the structure or geometry of the line and the instrument components, particularly in connection with the measurement of electrical voltage or energy in the very high frequency ranges. In the present invention the sampling is effected in a capacitance voltage divider arrangement employing a unitary pickup or cartridge assembly. This assembly is characterized by short connections between components and the arrangement of components such as a probe, a rectifier, an isolation capacitor and elements of a coaxial line connection on a common axis.

Figure 2:
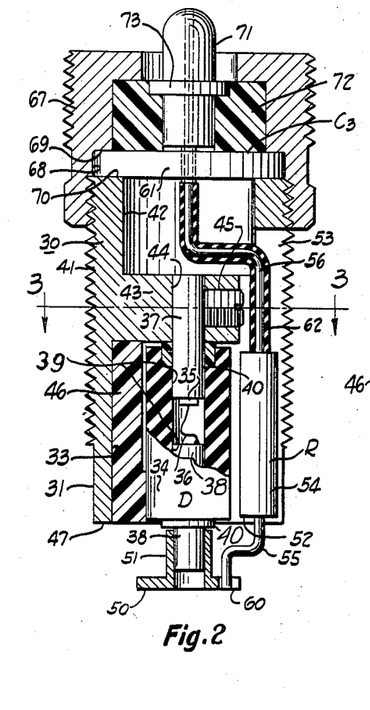
Fig. 2 is a longitudinal sectional view through the probe and rectifier assembly or cartridge showing the latter removed from the socket or receptacle provided therefor on the coaxial line of Fig. 1, this view being taken substantially along the line indicated at 2—2 of Fig. 1 and enlarged with respect to that figure.

To receive such a pickup assembly, preferably in removable or adjustable relation, the coaxial line structure described is provided with a tubular mounting member 24 having an internal socket open at both ends and registering with an opening 25 in the outer conductor of the line. The outer conductor 1 and the mounting or connector element 12 of the line are machined or otherwise formed with a recess or flat 26 to receive the end of the socket member 24 and a strengthening collar 27 is received about the base of the socket member and against the external surface of the line parts, the several pieces being secured together as by solder. The outer portion of the bore through the tubular mounting or socket member 24 is internally threaded to receive externally threaded barrel or body 30 of the pickup assembly or cartridge. On its lower or inner end the body 30 is formed with an external cylindrical pilot surface 31 that, in assembly, is guided by a sliding fit in a mating cylindrical pilot section of the socket member 24, threads 32 being formed in an outer counterbored portion of the latter to engage body threads 41. A cylindrical bore or axial recess 33 is formed in the lower or inner end of the body and receives a rectifier unit D. This rectifier is any one of several well-known constructions such as that marketed by General Electric Company and known as Germanium Diode Model G7B. It comprises a germanium pellet or semiconductor crystal 35 contacted by a metal wire or so-called cat whisker 36. The crystal and cat whisker are mounted on the ends of axially aligned cylindrical conductor posts or pins 37 and 38 of nickel or similar metal. The pins are received snugly within opposite ends of center passage 39 of a tubular cylindrical shaped insulating body 34 of the rectifier unit, each being held by an annular band of cement 40.

The upper or outer end of the cartridge body 30 is axially bored or formed with a recess or chamber 42, a transverse wall or partition 43 separating the chambers 33 and 42. The terminal pin 37 of the rectifier unit D is received in a hole 44 drilled through the partition 43 on the axis of the cartridge body 30, the contact pin being retained in the partition as by solder or a set screw 45 to insure good electrical connection between the terminal of the rectifier and the body of the cartridge assembly to which one side of the rectifier is thus grounded.

In the lower end recess 33 an annular sleevelike insulator 46 of polyethylene or the like embraces the rectifier body 34 to locate the latter on the axis of the cartridge assembly, the insulator being disposed in an annular space which separates the casing of the rectifier unit and the cylindrical recess wall 33.

The contact pin 38 of the rectifier unit, located on the axis of the cartridge assembly, projects beyond the plane of lower end 47 of the body 30 and carries a probe in the form of a circular metal capacitor plate 50 which is disposed in a plane normal to the cartridge axis and parallel to the line axis. A tubular axially split sleeve 51 is formed integrally on the plate 50 and extends axially from one side of the latter. The sleeve is received telescopically over the contact pin 38 of the rectifier unit. The split sleeve is sprung to grip the pin 38, thereby holding the parts together and facilitating the soldering of the pin in the sleeve. The opening or passage through the sleeve is preferably continuous through the center of plate 50 so that the soldering may be accomplished through the opening in the plate.

Figures 3, 4, 5:
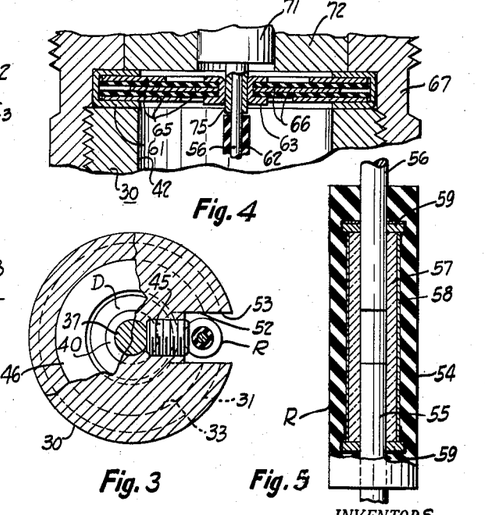
Fig. 3 is a fragmentary sectional detail taken substantially along the line indicated at 3—3 of Fig. 2.
Fig. 4 is an enlarged sectional detail through the by-pass capacitor.
Fig. 5 is an enlarged elevational view, partly in section, showing the construction of the resistor.

Alongside the rectifier unit 34 and disposed in elongated slots 52 and 53 formed respectively in the insulator 46 and the wall of the body 30 is a resistor which, with the capacitance between the parts associated with the probe plate 50 and the grounded components determines the time constant RC of the galvanometer circuit. The resistor has copper lead wires 55 and 56 projecting from opposite ends and is of well-known standard construction. It comprises a glass or ceramic tube 57 of cylindrical shape the ends of which receive the lead wires 55 and 56. Resistive carbon film 58 or the like is coated on the outer surface of the tube 57 and makes connection with the lead wires 55 and 56 as through conductive metal paint and metal ferrules 59 soldered to the wires. A tubular insulating body 54 encloses the glass insulating tube 57, protecting the carbon film 58 thereon and strengthening the unit. By positioning the resistor R in an elongated body slot parallel to but offset laterally from the axis of the cartridge, the axis of the resistor thus being parallel to and laterally offset from the axis of the rectifier unit 34, these components of the cartridge assembly are located closely adjacent one another and are shielded by the surrounding metal body 30 and the metal socket or mounting member 24. The device thus effects space economy by utilizing the metal of the mounting member 24 for its shielding or isolating effect. As shown in Fig. 2, the lower end of the resistor R is disposed substantially in the plane of the lower end 47 of the cartridge body for connection of the resistor to the probe plate 50 by the lead wire 55 which is thus of minimum length. A convenient connecting arrangement is to form a radial slot or notch 60 in the edge of the plate 50 and to solder the lead wire in such notch. The lead wire 56 projecting axially from the upper end of the resistor R, fitted with an insulating sleeve 62, extends through the body slot 53 and into the recess 42 in the outer or upper end of the cartridge body 30.

Disposed across the outer end of the cartridge body 30 is a button type capacitor C3. This capacitor is itself conventional but is employed in a novel combination and association. It comprises a circular inner contact ring or ferrule 63 and a circular outer contact ring concentric to the inner ring. Each of the rings is electrically connected as by direct press fit contact or by solder to one or more plate or leaf elements 65 separated by insulating means such as mica sheets. The plate elements 65 are of such area as to provide the desired capacitance which, for the devices of the present invention intended for use in the frequency range of from about twenty or thirty megacycles (Figs. 7–12) to about three or four thousand megacycles (Figs. 1–6) is of the order of about five hundred micromicrofarads (mmfd.).

A retention sleeve 67 is received over the outer end of the cartridge body 30, being screwed onto the external threads on the latter, the sleeve having a series of counterbores providing a cylindrical wall portion 68 for receiving the capacitor C3 in a sliding fit and centering the latter on the axis of the cartridge body and a radial shoulder 69 which, in cooperation with upper or outer end face 70 of the cartridge body 30, clamps the capacitor in place and insures good electrical connection between the outer ring of the capacitor and the cartridge body. An elongated cylindrically shaped center contact or terminal element 71 extends axially through the outer portion of the chamber in the retention sleeve 67, being held by an annular insulator 72 of polytetrafluoroethylene or the like confined axially between the capacitor C3 and an inwardly directed circular flange 72 on the outer end of the retention sleeve. An integral circular flange 73 on the terminal element 71 locates the latter axially with respect to the insulator and the retention sleeve 67, the connector flange being received in a counterbore in the outer end of the insulator 72. An integral reduced diameter tubular extension 75 on the connector element 71 extends through the opening in the center ring or eyelet 73 of the capacitor C3, good electrical connection being insured by soldering. The copper lead wire 56 from the resistor R extends axially through the tubular extension 75 and through a continuous axial bore in the terminal element 71, being soldered thereto in assembly.

The capacitor C3 serves to isolate high frequency energy to prevent the same reaching the external galvanometer. The direct current of the cartridge circuit is carried to galvanometer G as by a two conductor coaxial line 76 which is attached to the outer end of the cartridge assembly by a detachable connector of conventional design. In the arrangement shown the connector comprises an internally threaded collar 77 received over the outer end of the retention sleeve 67 and threaded onto the latter. The collar has an inturned flange which holds captive a metal cup 78 carried by a tubular metal body 79 into which the end of the coaxial line 76 is projected and held captive as by a compression fitting 80. The outer conductor of the coaxial line 76 is of woven or braided metal filaments and through the metal body 79 the cup 78, the collar 77 and the retention sleeve 67 makes electrical connection with the body 30 of the cartridge assembly. The center conductor of the coaxial line 76, indicated at 81, extends into the interior of the cup 78, where it is gripped between the convolutions of a helical coil contact spring 82 insulated at 83 from the walls of the cup 78. The connector or terminal element 71 projects axially into the cup 78 through an opening in the insulation 83 and contacts the metal spring 82, the resiliency of the latter maintaining the electrical connection under conditions of vibration or slight relative movement of the parts. Thus the electrical connection from the galvanometer through the center conductor 81 of the coaxial line 76 is established through the terminal element 71 to the lead wire 56 of the resistor R.

The germanium diode rectifier D (or D′) of the type referred to and as presently available operates most reliably and exhibits its most favorable or flat response characteristics when the rectified voltage across its terminals is between about 1 volt and about 1.5 volts, the present instrument being designed to place about 1.1 volts across the rectifier terminals at full scale deflection of the galvanometer G (or G′). The galvanometer sensitivity may be varied to suit the particular application of the instrument, a galvanometer drawing about 100 microamperes on full scale deflection being suitable for an instrument of general use. Such a galvanometer, having an internal resistance of about 2,000 ohms, requires a load resistor R (or R′) of about 9,000 ohms so that, in accordance with Ohm's law, the full scale deflection of the meter at 100 microamperes is obtained with about 1 volt across the terminals of the rectifier D. It is contemplated, of course, to use load resistors R (and R′)

of different values, a 1,500-ohm load resistor being usable with a galvanometer G (or G') of, say, 1,000-microampere full scale deflection and a 30,000- to 40,000-load resistor R (or R') being suitable with a 30-microampere full scale deflection galvanometer.

In the operation of the device the cartridge assembly is screwed into the socket to a depth sufficient to place the capacitor or probe plate 50 in the electrical field which prevails between the conductors 1 and 2 of the main coaxial line when the latter is receiving energy as from the signal generator indicated. The plate 50 is thus common to both capacitances of a capacitance voltage divider, one capacitance of the divider (indicated at C1 of Fig. 6) being that between the plate 50 and the center conductor 2 of the coaxial line, the other capacitance of the divider (indicated at C2 of Fig. 6) being that prevailing between the plate 50 and its associated metal parts considered collectively and the grounded metal parts, such as the tubular cartridge body 30, the mounting member 24 and the outer conductor of the main coaxial line, also considered collectively. The capacitance C2 is thus a lumped capacitance and includes stray components between the central parts of the cartridge located on the axis of the latter and the outer or grounded parts. The voltage division obtained or the ratio between the voltage across C1 and that across C2, the latter of course being that which is impressed across the rectifier R, can be varied by screwing the cartridge assembly into or out of the mounting member 24. Since the voltage portion impressed across the rectifier determines the voltage to which the galvanometer G is subjected, we have a convenient arrangement for varying the power range over which the instrument can be employed and for compensating for rectifier or crystal sensitivity or efficiency. The cartridge assembly is merely screwed in or out of the socket member 24 until with maximum power being fed into the reflectionless termination of the main coaxial line full scale deflection of the galvanometer G is obtained. By suitable readings taken during stepdown of the power the instrument is readily calibrated over the desired range in accordance with standard practice. When so adjusted and calibrated, the cartridge body 30 is secured in fixed relation to the socket or mounting member 24 as by a threaded locking collar 84 which is received on the externally threaded body 30 of the cartridge assembly and is tightened against the upper face of the mounting member 24.

A protective sleeve 85 is received over the cartridge assembly and the upper end of the mounting member 24, this sleeve having a circumferentially continuous cylindrical upper portion, which surrounds the retention sleeve 67 and the locking collar, and a lower portion formed with axial slots 86, which embraces the mounting member 24. Internal flanges 87 on the lower end of the sleeve are received in a circular groove formed in the mounting member 24 to locate the parts and to hold the protective sleeve in predetermined axial relation to the mounting member. The axial slots 86 permit slight expansion of the lower portion of the sleeve which carries the flanges 87 so that the latter may be withdrawn from the annular groove in the mounting member 24.

The axis of the rectifier cartridge or probe assembly, along which the body 30, the probe plate 50, the rectifier D, the by-pass condenser C3 and the elements 67 and 71 of the terminal connector for the galvanometer cable are arranged in coaxial relation, is so disposed, and this is a feature of the invention, that it intersects the inner conductor 2 of the coaxial line substantially at the juncture between the resistive film 9 and the highly conductive metal portion of the inner conductor here represented by edge 23 of the metalized paint band which is at the end of the tubular connector portion 17 or adjacent thereto. This location of the probe axis in the plane of the juncture between the line conductor components of highly diverse conductivity, rather than in a plane displaced axially of the line from such juncture has been found to result in improved operating characteristics and to provide an instrument of greater accuracy and reliability.

The device of Figs. 1 through 6 is especially effective in giving a desirable "flat" response curve in the higher frequencies, say in the range above about five hundred megacycles and up to at least about three thousand megacycles and accurate within a ten percent range of the power being measured, although it is also satisfactory with somewhat less accuracy at frequencies as low as two hundred megacycles. As the frequency range of operation is lowered, the capacitance effects between the probe plate 50 and the grounded components such as the cartridge body 30, the receptacle or socket member 24 and related parts are insufficient to obtain the desired time constant for holding a peak charge and the response of the galvanometer falls off. Use of a capacitor as an identifiable or separate element or component of the combination is thus indicated where this type of instrument is to be employed at lower frequencies, say in the range of from about twenty or thirty megacycles to about two thousand megacycles.

Figs. 7 through 12 illustrate certain features of the invention as incorporated in such an instrument wherein a button capacitor is employed as one element of a capacitance voltage divider. In this modification the pickup cartridge or assembly is received in the socket of a receptacle 90 screw threaded at 91 in a mounting ring 92 of Z section. This mounting ring is soldered to the outer tubular conductor 93 of a coaxial line, the ring having an integral cylindrical tubular portion 94 received in circular opening 95 of the outer conductor 93. In the application of the invention to a peak reading meter in which the pickup assembly is associated with a line termination, the termination may be of any desired rating or power absorbing and dissipating capacity, such, for example, as the type shown in U. S. Patent 2,556,642, dated June 12, 1951. In such arrangement the tubular outer conductor 93 may be the tapered connector of the resistive device or termination referred to. Described briefly, such a coaxial line termination is of the liquid dielectric coolant type and may comprise a hollow cylindrical insulating core 96 on which is deposited a thin resistive carbon layer or film coating 97 as the center conductor of the line. A horn-shaped outer conductor 98 of brass or similar metal surrounds the resistive inner film conductor 97 in coaxial relation, the small end of the horn embracing one end of the tube 96. Good electrical contact is insured by a clamp 99 which holds the horn in tightly embracing relation about a metalized paint terminal band on the inner resistive conductor. The large end of the horn conductor 98 is formed with a cylindrical section 100 received telescopically within a similarly shaped socket 101 of a conically tapered connector 93 spun or otherwise shaped from brass or similar metal.

Figures 7, 8, 9, 10, 11, 12:
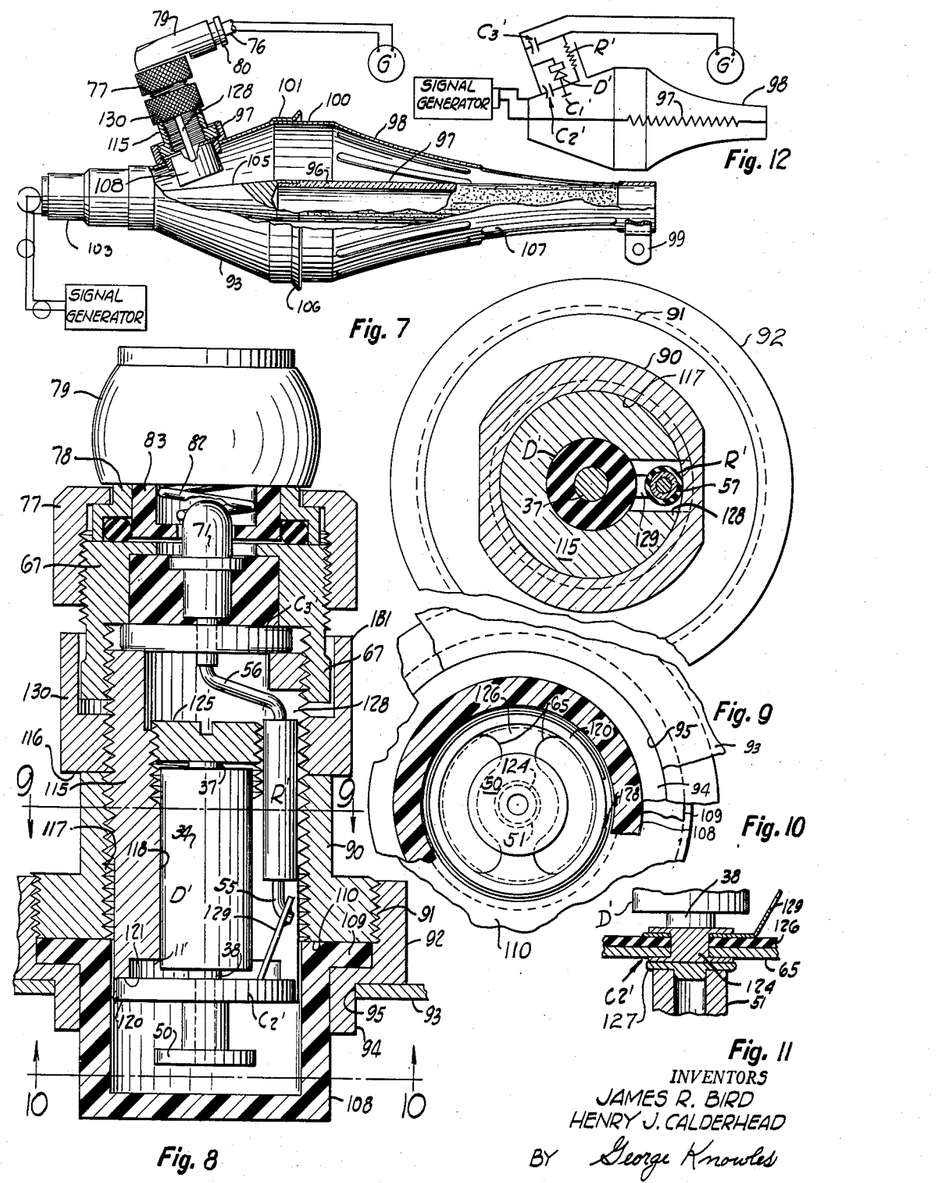
Fig. 7 is an elevational view, partly diagrammatic, partly in section and with parts broken away and removed, showing another high frequency electrical instrument similar to that of the preceding figures and employing a button capacitor as one of the capacitors of the capacitance voltage divider.
Fig. 8 is a sectional view showing the removable probe and rectifier cartridge assembly or pickup, together with the mounting socket or receptacle therefor, this view being taken substantially along the line indicated at 8—8 of Fig. 7 and enlarged with respect to that figure.
Fig. 9 is a sectional detail taken substantially along the line indicated at 9—9 of Fig. 8.
Fig. 10 is an axial view of the probe end of the device, this view being taken substantially along the line indicated at 10—10 of Fig. 8.
Fig. 11 is a fragmentary sectional detail showing the connection of the probe to the eyelet or center terminal of the button capacitor of the capacitance voltage divider.
Fig. 12 is a diagram of the electrical circuit of the instrument of Fig. 7.

At its small diameter end the tapered outer connector is secured to a standard coaxial line fitting 103 by means of which the device is attached to a coaxial cable or the like for connection to a signal generator as indicated. The center conductor of the coaxial cable from the signal generator is connected by means of the center contact (not shown) in the standard fitting 103 to a tapered connector 105 that leads to the resistive inner conductor 96—97 of the reflectionless line termination described. A flange 106 on the socket portion 101 of the tapered outer connector 93 permits the termination to be mounted in a casing filled with a liquid dielectric coolant such as mineral oil as illustrated in the patent referred to. Slots 107 in the logarithmically curved horn 98 permit the liquid dielectric coolant in the casing to circulate freely through the annular dielectric space which surrounds the inner resistive conductor 96—97 between the latter and the outer conductor horn 98.

To seal the access or probe opening 95 in the tubular outer connector or conductor 93 an insulating cup 108 is disposed in the opening, being embraced by the cylindrical portion 94 of the mounting ring 92. The cup is preferably formed of an oil-resistant plastic material such as polytetrafluoroethylene and has an integral radial flange 109 that is gripped between lower face 110 of the receptacle 90 and a radial shoulder 111 of the ring 92.

The pickup or rectifier cartridge assembly comprises a barrel or body 115 externally threaded at 116 over the major portion of its length for adjustable mounting in the receptacle 90, the socket of which is formed with complemental internal threads 117. Disposed in an axial bore in the lower end of the body 116 is a rectifier unit D' of substantially the same construction as rectifier D of the device described in connection with Figs. 1 through 6. Across a shallow recess 119 in the lower end of the cartridge body 116 is disposed a button capacitor C2' of not over about 20 micromicrofarads, preferably less than 15 micromicrofarads being satisfactory. This capacitor provides capacitance corresponding to C2 described in connection with the embodiment of Figs. 1–6 as a lumped stray capacitance. The capacitor C2' is of the silver-mica type, the construction of which corresponds to that described in connection with the by-pass capacitor C3, the areas of the plates of the capacitor C2' being of such size and of such number as to give the desired relatively low capacitance. Its outer metal frame 120 is received against a circular radial shoulder 121 formed by a counterbore in the extreme lower or inner end of the body 116, the capacitor rim also being embraced by annular cylindrical wall 122. At its center and disposed on the axis of the cartridge body 116 the capacitor C2' has an eyelet or terminal 124, Fig. 11, which is electrically connected to one, or the center, plate of the capacitor.

The contact pins 37 and 38 of the rectifier unit D' are cut off short so as to project only slightly beyond the ends of the insulating body 34. The contact pin 38 bears directly against the center eyelet or contact 124 of the button capacitor C2'. A threaded plug 125 is screwed into an axially extending threaded portion of the upper or outer end of the bore 118, the plug 125 bearing against and electrically contacting the upper terminal pin 37 of the rectifier unit D'. The rectifier, slidable axially and closely guided in the bore 118, is thus confined between the screw plug 125 and the eyelet 124 of the capacitor C2'. The capacitor embodies one or more mica sheets, indicated at 126, which yield resiliently under the axial pressure of the rectifier terminal pin 38, thereby maintaining constant yielding pressure not only between the terminal eyelet 124 of the capacitor and the terminal 38 of the rectifier but also between the rectifier terminal 37 and the metal plug 125, which latter grounds the upper terminal of the rectifier to the cartridge body.

A resistor R' corresponding to the resistor R described in connection with the embodiment of Figs. 1–6 is disposed in a longitudinally extending slot 128 in the body 116, corresponding to the slot 53 previously described. The lower terminal wire 55 of the resistor R' is soldered to a terminal tab or tail 129 carried by the eyelet 124 of the capacitor C2'. This terminal 129 is formed of flat sheet metal and has a loop at one end which receives the terminal eyelet 124 of the capacitor. The other end of the terminal 129 has a hole or aperture for receiving the terminal wire 55 of the resistor to facilitate soldering.

On the under side of the capacitor C2' the end of the tubular stem 51 of the probe plate 50 is soldered to the terminal eyelet 124 in abutting relation so that the stem 51 is disposed on the axis of the rectifier D' and of the cartridge body 116. The probe plate 50, disposed in the interior of the dielectric cup 108, is thus supported within the opening 95 of the outer line conductor, the cup preventing the liquid dielectric coolant in the dielectric space of the main coaxial line or line terminal from escaping into the rectifier cartridge assembly.

The upper terminal wire 56 of the resistor R' is connected to a terminal or connector element 71 through the center hollow eyelet of a by-pass capacitor C3' which corresponds to the by-pass capacitor C3 described in connection with the device of Figs. 1–6. A knurled locking collar 130 similar to the collar 84 and including an integral axial extension flange 131 is threaded on the body 116 and is tightened against the end of the retention sleeve 67 to secure the latter on the cartridge body. In other respects also the cartridge assembly of Figs. 7–12 corresponds or is similar to the device first described and like parts have been correspondingly numbered.

The capacitance voltage divider in the Figs. 7–12 instrument comprises the capacitance C1', which is that existing between the center conductor of the coaxial line and the probe plate 50, and the capacitance of the button capacitor C2'.

It is desirable to minimize the extent to which the probe or coupling plate 50 extends into the dielectric space separating the inner and outer conductors of the coaxial line, since the presence of the probe in the field of the line may give rise to reflections and other disturbances that affect the reading obtained by the instrument. The present invention, by utilizing a very low capacitance for the component C2 (or C2') as one component of the capacitance voltage divider permits effective low voltage sampling of the energy or voltage being measured while avoiding objectionable extension of the probe or pickup into the electric field of the line.

In the commercial manufacture of high frequency instruments of the type described it is necessary to adjust each instrument at the time of original assembly and calibration so that compensation can be made for variations in the individual characteristics of the several components connected together in the combination. This adjustment is effected by bodily shifting of the entire cartridge assembly along its axis, which axis intersects and is disposed at an angle to the axis of the coaxial line on which the pickup is mounted, by means of the screw-threaded connection of such body in the threaded mounting socket. In the event of replacement of one of the cartridge components as, for example, the rectifier D (or D') the instrument is thus easily adjusted or recalibrated to compensate for minor variations in sensitivity as between the original rectifier and the replacement.

As a further advantage of the removable and axially adjustable sampling cartridge provided by the present invention an instrument for use at any desired power rating can be obtained by adjustment of the degree or extent of the projection of the capacitor plate probe 50 into the space between the inner and outer conductors of the coaxial line. For instruments that are to be used at relatively high power, a minimum projection of the capacitor probe is employed, whereas for instruments to be used at relatively low power the projection of the probe into the dielectric space is relatively greater.

In accordance with the patent statutes the principles of the present invention may be utilized in various ways, numerous modifications and alterations being contemplated, substitution of parts and changes in construction being resorted to as desired, it being understood that the embodiments shown in the drawings and described above are given merely for purposes of explanation and illustration without intending to limit the scope of the claims to the specific details dicslosed.

What we claim and desire to secure by Letters Patent of the United States is:

1. A cartridge assembly for attachment to the tubular conductor of a high frequency electrical line to obtain a signal from electrical energy carried by the line, said assembly comprising a hollow conductive body having an internal partition dividing the interior into chambers opening through opposite ends of the body, a rectifier disposed in one of the body chambers, said rectifier having contact elements at opposite ends, one element being secured to the partition and the other element projecting beyond one end of the body, a circular capacitor having central and peripheral elements, means mounting the capacitor across the chamber opening at the other end of the body, a resistor, conductors connecting the resistor to said other of the rectifier contact elements and to the central capacitor element, and contact means making electrical connection with the capacitor elements.

2. A cartridge assembly for attachment to the tubular conductor of a high frequency electrical line to obtain a signal from electrical energy carried by the line, said assembly comprising a hollow conductive body having an internal partition dividing the interior into chambers opening through opposite ends of the body, a rectifier disposed in one of the body chambers, said rectifier having contact elements at opposie ends, one element being secured to the partition and the other element projecting beyond one end of the body, a circular capacitor having central and peripheral elements, a retainer threadedly engaging the other end of the body, the body and said retainer being formed with confronting shoulders adapted to grip the peripheral element of the capacitor, a resistor, conductors connecting the resistor to said other of the rectifier contact elements and to the central capacitor element, and contact means making electrical connection with the capacitor elements.

3. In combination for use in a high frequency electrical measuring device or the like, a tubular line conductor having an access aperture communicating with the interior of the conductor, a socket member secured to the line conductor and having a through passage aligned with the access aperture, a pickup cartridge assembly including a conductive body member and a probe carried by the body in insulated relation, said body member being formed with an internal chamber and a lateral slot opening through one side of the body member and continuous with such chamber, means mounting the cartridge assembly in the socket member passage with the probe in the access aperture of the line conductor, with an outer end of the cartridge assembly projecting from the socket member and for bodily shifting of the cartridge assembly in adjusting the position of the probe relative to the aperture, a sleeve embracing the socket member for facile removal and replacement independently of the cartridge assembly, the sleeve and the socket member being interfitted for locating the sleeve in predetermined position on the socket member with the outer end of the cartridge assembly projecting beyond the sleeve, the cartridge assembly being shiftable independently of the sleeve in effecting probe adjustment, conductor means electrically connected to the body and the probe for connecting the cartridge assembly to an indicator or the like, the connection of the conductor means to the probe including an electrical circuit component located in the body chamber, said sleeve being electrically conductive and covering the slot opening to constitute an electrical shield for said circuit component, and a cap carried by the conductive body outwardly of the sleeve for holding the conductor means assembled to the body.

4. In combination for use in a high frequency electrical measuring device or the like, a tubular line conductor having an access aperture communicating with the interior of the conductor, a socket member secured to the line conductor and having a through passage aligned with the access aperture, a pickup cartridge assembly including a conductive body member and a probe carried by the body member in insulated relation, said body member being formed with an internal chamber and a lateral slot opening through one side of the body member and continuous with such chamber, means mounting the cartridge assembly in the socket member passage with the probe in the access aperture of the line conductor, with an outer end of the cartridge assembly projecting from the socket member and for bodily shifting of the cartridge assembly in adjusting the position of the probe relative to the aperture, a sleeve embracing both the socket member and the body member and having an expansible end portion interfitted with the socket member to locate and retain the sleeve in predetermined axial relation to the socket member, the outer end of the cartridge assembly projecting beyond the sleeve, the cartridge assembly being shiftable independently of the sleeve in effecting probe adjustment, conductor means electrically connected to the body and the probe for connecting the cartridge assembly to an indicator or the like, the connection of the conductor means to the probe including an electrical circuit component located in the body chamber, said sleeve being electrically conductive and covering the slot opening to constitute an electrical shield for said circuit component, and a cap carried by the conductor body outwardly of the sleeve for holding the conductor means assembled to the body.

5. A pickup cartridge assembled for use in combination with a tubular electrical transmission line having an access aperture and a circular socket continuous with the aperture, said assembly comprising a coaxial arrangement of a hollow conductive body of circular section, a rectifier unit having contact elements at opposite ends, a capacitor having concentric central and peripheral contact elements, and a probe, the rectifier being disposed within the conductive body with the contact elements on the axis of the body, the capacitor having its peripheral element electrically connected to and supported by the body with the central element on the said axis, the probe being disposed on said axis as a continuation of and electrically connected to the contact element at one end of the rectifier, the capacitor being spaced axially from the other end of the rectifier, the contact element at said other end of the rectifier being electrically connected to the body, and a resistor carried by the body and connected electrically between the probe and the central element of the capacitor, the cartridge assembly being receivable within the transmission line socket with the probe disposed in the access aperture.

6. An electrical pickup for use with a high frequency line having a tubular conductor formed with an access aperture and a mounting member formed with a socket communicating with said aperture, said pickup comprising a hollow metal body of circular section receivable in the socket of the mounting member and having a wall formed with an axial slot, a rectifier received within the body, said rectifier being substantially centered on the axis of the body and having contact elements at opposite ends, a capacitor supported by the body, a resistor disposed in the body slot, conductors connecting the resistor to one of the rectifier contact elements and to the capacitor, a probe carried by the body in insulated relation said probe being electrically connected to said one of the rectifier contacts and disposed on the body axis so as to be receivable in the access aperture of the line conductor upon mounting of the pickup in the socket, the other of the rectifier contacts being grounded to the body to complete the pickup circuit, and terminal means electrically connected to the capacitor and the metal body for connecting the pickup to an indicator or the like.

7. An electrical pickup for use with a high frequency line having a tubular conductor formed with an access aperture and a mounting member formed with a socket communicating with said aperture, said pickup comprising a hollow metal body of circular section receivable in the socket of the mounting member and having a wall formed with an axial slot, a conductive support inside the metal body dividing the interior into chambers, the body being formed with end openings communicating with said chambers, a rectifier secured to the support and extending through one of the body chambers, a pair of button capacitors each having a central and a peripheral element, means mounting the capacitors across the end openings of the body with the peripheral elements electrically connected to the body, the rectifier having contact elements connected one to the support thereby grounding such one contact element to the body and another to the central element of one of the capacitors, a resistor disposed in the body slot, conductors connecting the resistor between the central elements of the capacitors, a probe carried by the body in insulated relation said probe being electrically connected to one of the rectifier contacts and disposed on the body axis so as to be receivable in the access aperture of the line conductor upon mounting of the pickup in the socket, a terminal electrically connected to the central element of the other capacitor, and means supporting the terminal on the axis of the body in insulated relation to the latter.

8. A cartridge assembly for attachment to the tubular conductor of a high frequency electrical line to obtain a signal from electrical energy carried by the line, said assembly comprising a conductive metal body of generally circular section formed with an axially disposed substantially cylindrical chamber open through one end of the body and with an axially extending slot communicating with said chamber and having generally parallel confronting walls, a rectifier, an insulating sleeve embracing the rectifier and supporting the latter in the body chamber substantially on the axis of the latter, the rectifier having contact elements one of which is grounded to the body and the other of which is disposed substantially on the body axis, a probe extending axially from the last mentioned contact element and beyond the said one end of the body, a capacitor having central and peripheral elements, means mounting the capacitor at the other end of the body with the peripheral element grounded to the latter and with the central element on the body axis, a resistor disposed in the slot and confined by the walls of the latter against lateral movement, said resistor having conductors extending from opposite ends, one such resistor conductor being connected to the central element of the capacitor and the other to the probe, and a terminal supported by the body in insulated relation and electrically connected to the central element of the capacitor.

9. A sampling cartridge for use in combination in a high frequency electrical measuring device of the type that includes, a coaxial line comprising an inner conductor having a resistive film portion and an outer conductor surrounding the inner conductor in spaced relation and having a tapered portion associated with the resistive portion of the inner conductor in the provision of a reflectionless termination on the line, and an indicator coupled to the line through the sampling cartridge, said cartridge comprising a conductive body mounted on the outer conductor of the line and having an internal chamber continuous with the space between the line conductors, a rectifier unit carried by the body at one end of the latter, said rectifier unit having axially aligned contact elements projecting from opposite ends, the axis of the rectifier substantially intersecting the longitudinal axis of the inner conductor, a button capacitor disposed across the other end of the body and having a central aperture, a resistor having a pair of projecting conductors, one conductor of the resistor being connected to the contact element at one end of the rectifier and the other conductor of the resistor being extended through the aperture in the capacitor, and conductor means for connecting the last-named conductor and the capacitor to the indicator.

10. A sampling cartridge for use in combination in a high frequency electrical measuring device of the type that includes, a coaxial line comprising an inner conductor having a resistive film portion and an outer conductor surrounding the inner conductor in spaced relation and having a tapered portion associated with the resistive portion of the inner conductor in the provision of a reflectionless termination on the line, and an indicator coupled to the line through the sampling cartridge, said cartridge comprising a conductive body mounted on the outer conductor of the line and having an internal chamber continuous with the space between the line conductors, a rectifier supported within the body chamber at one end of the body and having contact elements one of which projects along an axis substantially intersecting the inner conductor of the line, a probe on said one contact element including a plate disposed in a plane substantially normal to said axis, said plate constituting part of a capacitive divider of the coaxial line voltage in which divider the inner conductor of the line and the plate comprise one capacitance and the lumped capacitive effect between the plate and the outer conductor and the body comprise another capacitance, a terminal at the other end of the body, a resistor carried by the body and having wire conductors extending therefrom, one such wire conductor being connected to the probe plate and another to the terminal, conductors connecting the terminal and the body to the indicator, another of the rectifier contact elements being grounded to the body, and a capacitor connected across the body and the terminal to isolate the indicator from high frequency energy within the line and the chamber of the conductive body.

11. A sampling cartridge for use in combination in a high frequency electrical measuring device of the type that includes, a coaxial line comprising an inner conductor of relatively conductive and resistive portions which meet at a juncture line surrounding the conductor and an outer conductor surrounding the inner conductor in spaced relation and having a tapered portion associated with the resistive portion of the inner conductor in the provision of a reflectionless termination on the line, and an indicator coupled to the line through the sampling cartridge, said cartridge comprising a conductive body mounted on the outer conductor of the line and having an internal chamber continuous with the space between the line conductors, a rectifier unit carried by the body at one end of the latter, said rectifier unit having axially aligned contact elements projecting from opposite ends, the axis of the rectifier substantially intersecting the longitudinal axis of the inner conductor substantially at the juncture line between the conductive and resistive portions of the latter, a button capacitor carried by the body and disposed in a plane transverse to the rectifier axis, a resistor connected between the rectifier and the capacitor, and conductor means connecting the capacitor and the conductive body of the cartridge to the indicator.

12. A sampling cartridge for use in combination in a high frequency electrical measuring device of the type that includes, a coaxial line comprising an inner conductor of relatively conductive and resistive portions which meet at a juncture line surrounding the conductor and an outer conductor surrounding the inner conductor in spaced relation and having a tapered portion associated with the resistive portion of the inner conductor in the provision of a reflectionless termination on the line, and an indicator coupled to the line through the sampling cartridge, said cartridge comprising a conductive body mounted on the outer conductor of the line and having an internal chamber continuous with the space between the line conductors, a rectifier unit carried by the body at one end of the latter, said rectifier unit having axially aligned contact elements projecting from opposite ends, the axis of the rectifier substantially intersecting the longitudinal axis of the inner conductor substantially at the juncture line between the conductive and resistive portions of the latter, a button capacitor carried by the body at the other end of the latter, said capacitor having a central aperture, a resistor, a conductor connecting the resistor to one of the rectifier contact elements, another conductor connected to the resistor and extending through the aperture in the capacitor, and conductor means connecting the capacitor and the conductive body of the cartridge to the indicator.

13. A sampling cartridge for use in combination in a high frequency electrical measuring device of the type that includes a coaxial line comprising an inner conductor of relatively conductive and resistive portions which meet at a juncture line surrounding the conductor and an outer conductor surrounding the inner conductor in spaced relation and having a tapered portion associated with the resistive portion of the inner conductor in the provision of a reflectionless termination on the line, and an indicator coupled to the line through the sampling cartridge, said cartridge comprising a conductive body mounted on the outer conductor of the line and having an internal chamber continuous with the space between the line conductors, a rectifier unit carried by the body at one end of the latter, said rectifier unit having axially aligned contact elements projecting from opposite ends, the axis of the rectifier substantially intersecting the longitudinal axis of the inner conductor substantially at the juncture line between the conductive and resistive portions of the latter, a circular capacitor having central and peripheral elements, means mounting the capacitor on the body in a plane transverse to the rectifier axis, a resistor, conductors connecting the resistor to one of the rectifier contact elements and to the central capacior element, and conductor means connecting the capacitor and the conductive body of the cartridge to the indicator.

14. A pickup assembly for use in a high frequency electrical measuring device or the like which device is of the type comprising a coaxial line having a center conductor, a tubular outer conductor surrounding the center conductor in spaced relation, the center conductor including a resistive portion forming part of a reflectionless termination of the line, and an indicator coupled to the line through a pickup assembly, said assembly comprising a tubular metal body of circular section having an open ended chamber therein, a rectifying unit comprising an elongated body having terminals at opposite ends and rectifying means connected between the terminals, means supporting the unit substantially coaxially in the tubular body, a button capacior having a center opening disposed transversely across the body chamber, the capacitor having an element grounded to the metal body, one terminal of the rectifying unit being grounded to the metal body and the other terminal thereof extending through and beyond one end of the metal body, a resisor connected between the said other terminal of the rectifying unit and the button capacitor, means connecting the metal body and the button capacitor to the indicator, and means mounting the assembly on the outer conductor with said other terminal of the rectifying unit exposed to wave energy on the line, the axis of the metal body and of the rectifying unit being disposed substantially in a plane transverse to the coaxial line and containing the line end of the resistive portion of the center conductor.

15. A cartridge assembly for placement over an opening in the tubular conductor of a high frequency electrical line to obtain for an indicator a signal from energy carried by the line, said assembly comprising a conductive body having an internal chamber and formed with openings through opposite ends, means receiving the body for facile removal and replacement from and into supporting relation for mounting the body over such an opening in a tubular conductor with the body chamber in communication with the interior of the line through one of said open ends, a rectifier within the body at said one end, said rectifier having top and bottom contact elements projecting from its opposite ends and disposed on a common axis, means electrically connecting the top contact element of the rectifier to the body, a button capacitor disposed across the other end of the body and having central and peripheral contact elements, the capacitor being formed with an aperture through said central contact element and the peripheral contact element of the capacitor being grounded to the body, a resistor having a pair of projecting conductors, one conductor of the resistor being connected to the bottom contact element of the rectifier, the other conductor of the resistor being extended through the aperture in the capacitor and electrically connected to the central contact element of the capacitor, a probe insulated from the body and electrically connected to said bottom contact element of the rectifier, and means for connecting the last named conductor and the body to an indicator.

16. A cartridge assembly for placement over an opening in the tubular conductor of a high frequency electrical line to obtain for an indicator a signal from energy carried by the line, said assembly comprising a conductive body having an internal chamber and formed with openings through opposite ends, means receiving the body for facile removal and replacement from and into supporting relation for mounting the body over such an opening in a tubular conductor with the body chamber in communication with the interior of the line through one of said open ends, a rectifier disposed within the body and having oppositely projecting top and bottom contact elements on a common axis, a button capacior having central and peripheral contact elements, the peripheral contact element of the capacior electrically contacting and being secured to the body to support the capacior in fixed relation with the central contact element of the capacitor on the axis of the rectifier contact elements, conductive means threadedly engaging the body and in contact with the top contact element of the rectfiier to connect such top element to the body electrically, the bottom contact element of the rectifier being in electrical contact with the central contact element of the capacitor, rotation of the threaded conductive means relative to the body acting to shift such conductive means to bear axially against the top contact element of the rectifier and bias the bottom contact element of the rectifier against the central contact element of the capacitor in obtaining good electrical contacts in a series circuit of the rectifier between the capacitor and the body, a probe insulated from the body and electrically connected to one of the contact elements of the rectifier, and means for connecting the capacitor and the body to an indicator.

17. A cartridge assembly for placement over an opening in the tubular conductor of a high frequency electrical line to obtain for an indicator a signal from energy carried by the line, said assembly comprising a conductive body having an internal chamber and formed with openings through opposite ends, means receiving the body for facile removal and replacement from and into supporting relation for mounting the body over such an opening in a tubular conductor with the body chamber in communication with the interior of the line through one of said open ends, a rectifier disposed within the body and having oppositely projecting top and bottom contact elements on a common axis, a button capacitor having central and peripheral contact elements, the peripheral contact element of the capacitor electrically contacting and being secured to the body to support the capacitor in fixed relation with the central contact element of the capacitor on the axis of the rectifier contact elements, conductive means threadedly engaging the body and in contact with the rectifier top contact element to connect such top contact element to the body electrically, the rectifier bottom contact element being in electrical contact with the central contact element of the capacitor, rotation of the threaded conductive means relative to the body acting to shift such conductive means to bear axially against the rectifier top contact and bias the rectifier bottom contact element against the central element contact of the capacitor in obtaining good electrical contacts in a series circuit of the rectifier between the capacitor and the body, a probe insulated from the body and electrically connected to the bottom contact element of the rectifier, another button capacitor disposed across an end of the body and constituting a closure for the body opening at such end, said other capacitor having a peripheral contact element electrically contacting and being secured to the body and a central contact element on said axis, and means for electrically connecting the body and the central element of said other capacitor to an indicator.

18. A cartridge assembly for attachment to the tubular conductor of a high frequency electrical line to obtain a signal from electrical energy carried by the line, said assembly comprising a conductive metal body of generally circular section formed with an axially disposed substantially cylindrical chamber open through one end of the body and with an axially extending slot communicating with said chamber and having generally parallel confronting walls, a rectifier, an insulating sleeve embracing the rectifier and supporting the latter in the body chamber substantially on the axis of the latter, said sleeve having an axially extending slot registered with the body slot in the provision of a pocket offset laterally from the body axis, the rectifier having contact elements one of which is grounded to the body and the other of which is disposed substantially on the body axis, a probe insulated from the body and electrically connected to the rectifier, a capacitor having central and peripheral elements, means mounting the capacitor at the other end of the body with the peripheral element grounded to the latter and with the central element on the body axis, a resistor disposed in the offset pocket and confined by the slot walls, said resistor having conductors extending from opposite ends, one such resistor conductor being connected to the central element of the capacitor and the other to the probe, and a terminal supported by the body in insulated relation and electrically connected to the central element of the capacitor.

19. A cartridge assembly for placement over an opening in the tubular conductor of a high frequency electrical line to obtain for an indicator a signal from energy carried by the line, said assembly comprising a conductive body having an internal chamber and formed with openings through opposite ends, means receiving the body for facile removal and replacement from and into supporting relation for mounting the body over such an opening in a tubular conductor with the body chamber in communication with the interior of the line through one of said open ends, a probe supported at said one end of the body in insulated relation, a button capacitor disposed across the other end of the body and having central and peripheral elements, the capacitor being formed with an aperture through said central element and the peripheral element being grounded to the body, a terminal disposed in alignment with the central element of the capacitor, a threaded conductive sleeve secured to the body and surrounding the terminal in spaced relation, an insulator supporting the terminal in the sleeve, circuit components within the body, means electrically connecting the circuit components in a circuit including the body, the probe and the insulated terminal, said connecting means including a conductor extending through the aperture in the central element of the capacitor and connected to the terminal, and means for connecting the body and the terminal to an indicator comprising a cable having a cap screw threaded onto the sleeve and a contact supported by the cap in insulated relation for engagement with the terminal.

20. A cartridge assembly for placement over an opening in the tubular conductor of a high frequency electrical line to obtain for an indicator a signal from energy carried by the line, said assembly comprising a conductive body having an internal chamber and formed with openings through opposite ends, means receiving the body for facile removal and replacement from and into supporting relation for mounting the body over such an opening in a tubular conductor with the body chamber in communication with the interior of the line through one of said open ends, a probe supported by the body in insulated relation thereto and at said one end, a terminal supported by and at the other end of the body in insulated relation thereto, a button capacitor having peripheral and central contact elements, the peripheral contact element being secured and electrically connected to the body and the central contact element being apertured and disposed adjacent the terminal, circuit components within the body, means electrically connecting the circuit components in a circuit including the body, the probe and the insulated terminal, said connecting means including a conductor extending through the aperture in the central contact element of the capacitor and connected to the terminal, and means for connecting the body and the terminal to an indicator comprising a cable having a cap secured to the body for facile removal and replacement and a contact supported by the cap in insulated relation for engagement with the terminal.

References Cited in the file of this patent

UNITED STATES PATENTS

| | | |
|---|---|---|
| 2,106,713 | Bowen | Feb. 1, 1938 |
| 2,480,682 | Stiefel | Aug. 30, 1949 |
| 2,498,335 | Hunt | Feb. 21, 1950 |
| 2,555,151 | Noyes | May 29, 1951 |
| 2,624,780 | Byrne | Jan. 6, 1953 |
| 2,642,494 | Zaslavsky | June 16, 1953 |